No. 717,635. PATENTED JAN. 6, 1903.
I. D. SMEAD.
WOOD PIPE.
APPLICATION FILED SEPT. 2, 1902.
NO MODEL. 2 SHEETS—SHEET 1.

No. 717,635. PATENTED JAN. 6, 1903.
I. D. SMEAD.
WOOD PIPE.
APPLICATION FILED SEPT. 2, 1902.
NO MODEL. 2 SHEETS—SHEET 2.

Witnesses
C. C. Burdine
D. E. Burdine

Inventor:
Isaac D. Smead
by Dodge and Sons
Attorneys

UNITED STATES PATENT OFFICE.

ISAAC D. SMEAD, OF CINCINNATI, OHIO.

WOOD PIPE.

SPECIFICATION forming part of Letters Patent No. 717,635, dated January 6, 1903.

Application filed September 2, 1902. Serial No. 121,889. (No model.)

*To all whom it may concern:*

Be it known that I, ISAAC D. SMEAD, a citizen of the United States, residing at Cincinnati, in the county of Hamilton and State of Ohio, have invented certain new and useful Improvements in Wood Pipes, of which the following is a specification.

My present invention pertains to improvements in wood pipes, the construction and advantages of which will be hereinafter set forth, reference being had to the annexed drawings, wherein—

Figure 1:
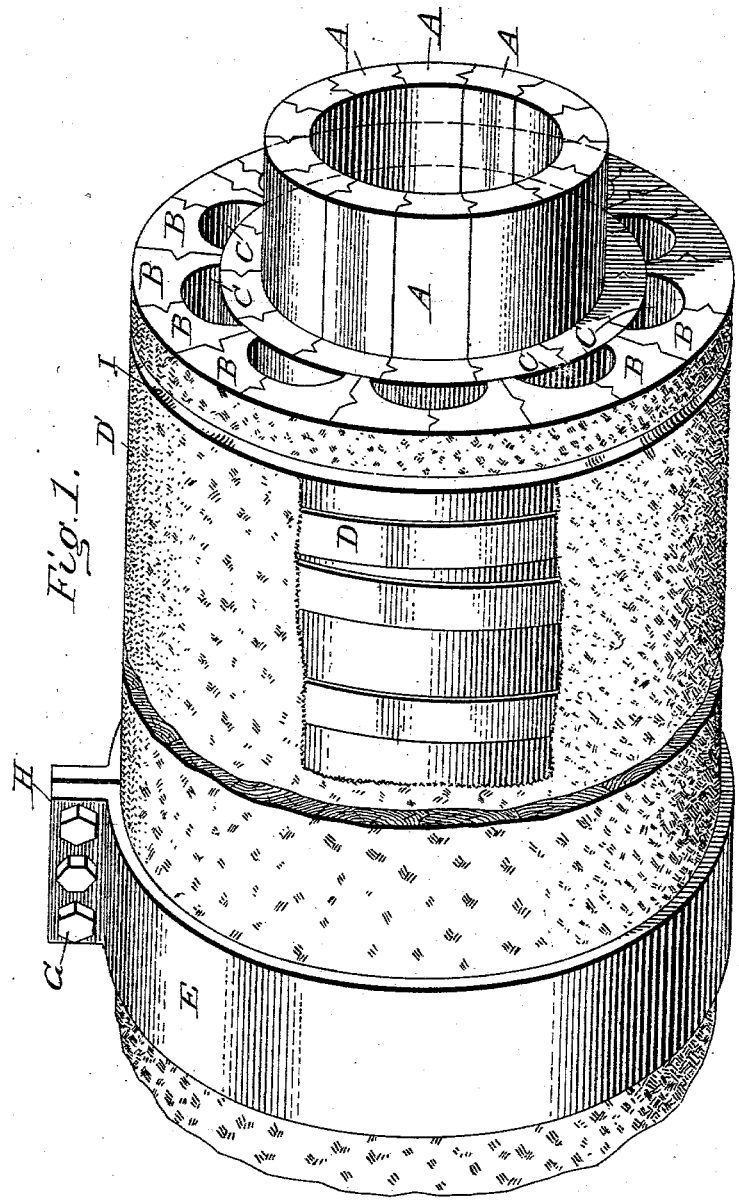
Figure 2:
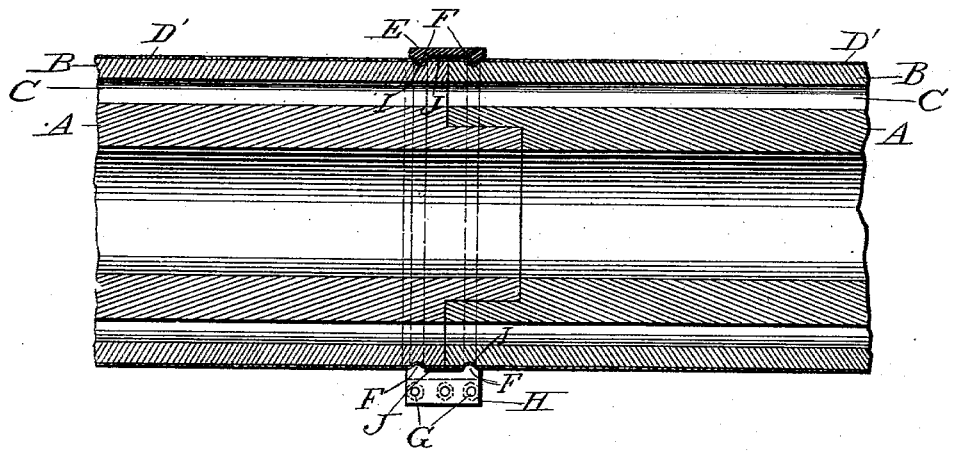

Figure 1 is a perspective view of a section of the pipe, parts being broken away to show the construction; Fig. 2, a longitudinal sectional view, and Fig. 3 a perspective view of a modified form of pipe with the same form of joint sealing and securing means as is employed and shown in the foregoing figures.

One object of my invention is to provide a series of air spaces or chambers formed at close intervals about the pipe and which extend throughout the length of the same in order to form a dead-air space, which materially prevents radiation from the hot water or the like which is passed through the pipe.

A further object of the invention is the provision of means for forming an absolutely tight joint between the ends of the pipes, thereby preventing the escape of fluid from the same. This is a feature which renders the invention of commercial importance, inasmuch as it is essential where the pipe is subjected to heavy pressure—for instance, in central-heating-plant systems—that no leaks should occur. With the construction hereinafter set forth this object is accomplished, and under actual test it is found that no leakage takes place.

Referring first to Figs. 1 and 2, it will be seen that the interior pipe is made up of a series of tongue-and-grooved sections A, which in turn are surrounded by a second series of staves B, the abutting edges of which are likewise formed with interlocking joints. These staves are so formed that when they are in position there is formed a series of pockets or air-chambers C, which run throughout the entire length of the pipe-section and prevent radiation to a greater or less extent. To properly secure the staves in place, steel hoops D are firmly bound around the staves in a manner well understood. The hoops may be passed about the various layers or series of staves as the pipe is built up, if so desired, though this is unessential to the present case. After the staves have been built up and the pipe otherwise finished—as, for instance, forming the socket and tenons in and on the opposite ends, respectively—the pipe as a whole is subjected to several successive layers of asphaltum, pitch, and sawdust, which give to the pipe a so-called "cross-fiber" coating D', thereby effectually preventing the pipe from leaking at its longitudinal joints.

With the ordinary socket-and-tenon joint, which is herein shown and most commonly used in wood-pipe service of to-day, it has been found very difficult to prevent leakage, especially where water under high pressure is to be conveyed. It is presumably due to the unequal expansion and contraction of the adjacent and overlapping pipe ends that this is so. The construction shown in all of the figures overcomes this difficulty, the construction of the band being the same in Fig. 3 as in the others, though in said figure the outer layer of staves B is omitted. The band or ring is, however, equally applicable to both forms.

Figure 3:
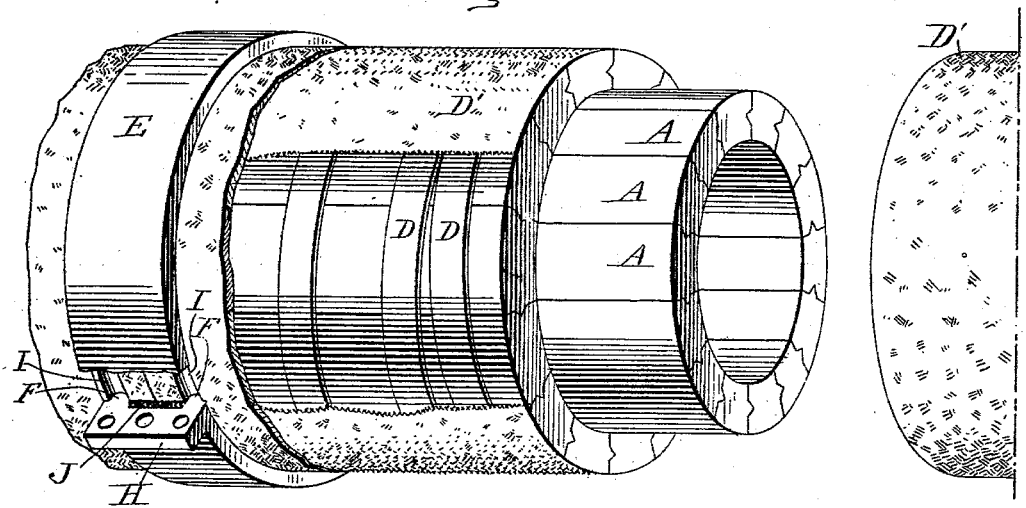

As the pipe-sections are being assembled a band or hoop E is placed loosely on one or the other section, and after the pipes have been forcibly driven up together the band is slipped along until it straddles a joint formed by the abutting ends. The band is formed upon its inner face, near or at each edge, with an inwardly-projecting flange or rib F, preferably rounded upon its innermost edge, as is clearly shown in Figs. 1 and 2. After the band is in position it is drawn together by bolts G, which pass through its outwardly-projecting ends H. As the band is drawn together the ribs F embed themselves in the wood, forming grooves or channels I, one of which is shown in Fig. 1, from which the hoop is assumed to have been removed. The grooves are also shown in Fig. 3, where the hoop is broken away. After the hoop has been partly drawn to place a suitable sealing material—such, for instance, as asphaltum or the like—is poured into the space formed between the pipe, the band, and the ribs on the band. The material is indicated at J, Fig. 3. After the space has been entirely filled the ends of the hoop or band are brought closely together, whereby a practically closed pocket is formed for the previously-introduced sealing material. The drawing together of the band or hoop causes the wood fibers to be condensed thereunder, thereby effectually preventing the passage of water therethrough should it find its way between the abutting ends of the pipe. The sealing material J prevents the direct passage or exit of the water or other fluid, and lateral flow from the joint is prevented, as just noted.

It is of course not essential that the band be formed of a single piece, though such construction is preferable for many reasons, as the band may be made of several lengths bolted or otherwise secured together.

The use of a band which bites or indents the wood in the manner set forth also prevents longitudinal separation of the pipe-sections.

While the pipe construction shown and described is the preferred one and the one which has been actually used, it is manifest that the sealing and retaining band may be used with other forms of wood pipe without departing from the spirit of my invention.

Having thus described my invention, what I claim is—

1. A wood pipe having a central hollow core, combined with a series of outer staves, a series of air chambers or spaces being formed intermediate said staves and the core.

2. A wood pipe formed of a series of staves having a series of spaces or chambers extending lengthwise of the pipe, independent of the bore thereof; and means for securing the staves together and thereby forming a unitary structure.

3. In combination with abutting wood-pipe sections, a band encircling the same, said band extending over the joint and being provided with means adjacent to each end thereof, said means bearing directly upon the pipe-sections and embedding themselves therein when the band is circumferentially tightened; a sealing material entirely filling the space within the band over the joint; and means for drawing the band together about the pipe.

4. In combination with abutting wood-pipe sections, a band encircling the same at the joint, said band being formed or provided with ribs or flanges which embed themselves in the body of the pipe-sections as the band is drawn to place; and a sealing material confined beneath the band over the joint, substantially as described.

5. In combination with abutting wood-pipe sections, a split band encircling the same at the joint; rounded ribs or projections formed upon the inner face of the band; means for drawing the ends of the band together, whereby the ribs condense the wood fiber below the same and embed themselves therein; and a sealing material confined beneath the band over the joint.

In testimony whereof I have signed my name to this specification in the presence of two subscribing witnesses.

ISAAC D. SMEAD.

Witnesses:
H. G. SKIFF,
E. M. FELTER.